United States Patent [19]
Hovestadt et al.

[11] Patent Number: 5,422,421
[45] Date of Patent: Jun. 6, 1995

[54] POLYHYDROXYL COMPOUNDS, A PROCESS FOR THEIR PRODUCTION AND THEIR USE IN COATING COMPOSITIONS

[75] Inventors: Wieland Hovestadt, Krefeld; Gerhard Ruttmann, Burscheid; Martin Brahm, Engelskirchen; Harald Blum, Wachtendonk; Jürgen Meixner, Krefeld; Christian Wamprecht, Neuss, all of Germany

[73] Assignee: Bayer Aktiengesellschaft, Leverkusen, Germany

[21] Appl. No.: 93,246

[22] Filed: Jul. 16, 1993

[30] Foreign Application Priority Data

Jul. 23, 1992 [DE] Germany .................. 42 24 365.3

[51] Int. Cl.$^6$ .................. C08G 63/08; C08G 63/82
[52] U.S. Cl. .................. 528/355; 528/354; 528/359; 528/392
[58] Field of Search .................. 525/386, 328.8, 327.7, 525/123, 186; 528/354, 355, 359, 392

[56] References Cited

U.S. PATENT DOCUMENTS

| | | | |
|---|---|---|---|
| 3,405,162 | 10/1968 | Kuryla | 260/465.6 |
| 3,892,714 | 7/1975 | Sampson et al. | 260/77.5 CR |
| 4,082,816 | 4/1978 | Fisk et al. | 260/855 |
| 4,368,320 | 1/1983 | Aldinger et al. | 528/355 |
| 4,529,787 | 7/1985 | Schmidt et al. | 526/317 |
| 4,988,763 | 1/1991 | Kessler et al. | 525/61 |
| 5,082,922 | 1/1992 | Brandenburger et al. | 528/323 |

FOREIGN PATENT DOCUMENTS 339477 11/1989 European Pat. Off. .

*Primary Examiner*—James J. Seidleck
*Assistant Examiner*—Mary Critharis
*Attorney, Agent, or Firm*—Joseph C. Gil; Thomas W. Roy

[57] ABSTRACT

The present invention relates to a process for the production of polyhydroxyl compounds having a hydroxyl group content of 2 to 10% by weight and a viscosity at 23° C. of 250 to 80,000 mPa.s by the radically initiated polymerization at a reaction temperature of 80° to 220° C. of a) 100 parts by weight of a mixture of olefinically unsaturated monomers containing at least 1% by weight of monomers containing alcoholic hydroxyl groups in the presence of b) 5 to 500 total parts by weight, which may be present at the beginning of the reaction or added during the reaction, of one or more cyclic compounds which, in the presence of initiator compounds containing alcoholic hydroxyl groups, are capable of a ring-opening polymerization reaction and c) 2 to 300 parts by weight, which may be present at the beginning of the reaction or added during the reaction, of one or more polyhydric alcohols having a molecular weight of 62 to 1000.

The present invention also relates to the polyhydroxyl compounds obtained by this process and to their use in combination with suitable hardeners as binders for one-component or two-component coating compositions.

7 Claims, No Drawings

POLYHYDROXYL COMPOUNDS, A PROCESS FOR THEIR PRODUCTION AND THEIR USE IN COATING COMPOSITIONS

BACKGROUND OF THE INVENTION

1. Field of the Invention

This invention relates to a new process for the production of organic polyhydroxyl compounds by the polymerization of olefinically unsaturated monomers, containing a portion of hydroxy-functional monomers, in the presence of cyclic compounds capable of polymerization reactions and low molecular weight polyhydric alcohols, to the polyhydroxyl compounds obtained by this process and to their use as a binder component in one- or two-component coating compositions, more particularly one- or two-component polyurethane coating compositions.

2. Description of the Prior Art

For ecological reasons, solvent emissions should be kept to a minimum during the application of coating compositions. For this reason, many high solids systems have recently been developed although, ideally, they should be free from solvents.

Ester-modified polyhydroxyl polyacrylates are valuable binder components in regard to their lacquer properties and may be processed as binders in combination with organic polyisocyanates to form coatings characterized by high resistance to chemicals, hardness and also flexibility (U.S. Pat. No. 3,892,714). The production of ester-modified polyhydroxy polyacrylates from the reaction of cyclic esters, particularly lactones, is described for example in EP-A-0,339,472 and in EP-A-0,339,477. According to U.S. Pat. No. 4,082,816, the ester-modified copolymers are prepared in a one-pot reaction in solvents, but must not contain any hydroxyl groups. According to PCT application WO 90/03991, this reaction is carried out in the absence of solvents and results in polyhydroxyl compounds which may be used as the binder component in powder coating compositions or solvent-containing coating compositions.

All of these known processes are attended by the disadvantage that the ester-modified polyhydroxyl compounds obtained as end products generally have too high a viscosity for the production of solventless or low-solvent coating compositions. Accordingly, it is an object of the present invention to provide a process for the production of modified, more particularly ester-modified, polyhydroxy polyacrylates which are comparable to known products in regard to their lacquer properties, but which differ advantageously from those products by having a considerably lower viscosity.

This object may be achieved by the process according to the invention described in detail hereinafter, in which low molecular weight polyhydric alcohols are used as component c). Both in unmodified form (no reaction with component b)) and after modification by reaction with component b), component c) acts as a reactive thinner resulting in a significant reduction in the viscosity of the system as a whole. The possibility of significantly reducing the viscosity of the end products through the use of the starting component c) in accordance with the invention was not foreseeable because the relevant prior art advises against using solvents containing hydroxyl groups by restricting the alcoholic components to the hydroxy-functional monomers.

SUMMARY OF THE INVENTION

The present invention relates to a process for the production of polyhydroxyl compounds having a hydroxyl group content of 2 to 10% by weight and a viscosity at 23° C. of 250 to 80,000 mPa.s by the radically initiated polymerization at a reaction temperature of 80° to 220° C. of a) 100 parts by weight of a mixture of olefinically unsaturated monomers containing at least 1% by weight of monomers containing alcoholic hydroxyl groups in the presence of b) 5 to 500 total parts by weight, which may be present at the beginning of the reaction or added during the reaction, of one or more cyclic compounds which, in the presence of initiator compounds containing alcoholic hydroxyl groups, are capable of a ring-opening polymerization reaction and c) 2 to 300 parts by weight, which may be present at the beginning of the reaction or added during the reaction, of one or more polyhydric alcohols having a molecular weight of 62 to 1000.

The present invention also relates to the polyhydroxyl compounds obtained by this process.

The present invention also relates to the use of the polyhydroxyl compounds obtained by this process, optionally after at least partial conversion of the hydroxyl groups into acetoacetic ester groups and/or optionally together with other hydroxy-functional compounds, in combination with suitable hardeners as binders for one-component or two-component coating compositions.

DETAILED DESCRIPTION OF THE INVENTION

The monomers a) are mixtures of a1) 1 to 70% by weight, preferably 5 to 50% by weight, of monomers containing alcoholic hydroxyl groups, a2) 30 to 99% by weight, preferably 45 to 95% by weight, of monomers which are free from hydroxyl and carboxyl groups and a3) 0 to 20% by weight, preferably 0 to 5% by weight, of monomers containing acid groups.

Suitable monomers a1) include hydroxyalkyl esters of $\alpha,\beta$-unsaturated carboxylic acids, preferably acrylic acid or methacrylic acid, containing 2 to 12, preferably 2 to 6, carbon atoms in the hydroxyalkyl component. Examples include 2-hydroxyethyl acrylate, 2-hydroxypropyl acrylate, 1-hydroxymethylethyl acrylate, 2-, 3- and 4-hydroxybutyl acrylate, the isomeric hydroxyhexyl acrylates and the methacrylates corresponding to these acrylates. Hydroxy-functional monomers modified or chain-extended with ethylene, propylene and/or butylene oxide and having a maximum molecular weight of 376 are also suitable.

Suitable monomers a2) include mono-olefinically unsaturated compounds having a molecular weight of 53 to 400, preferably 80 to 220. Examples include alkyl or cycloalkyl esters of acrylic or methacrylic acid containing I to 18, preferably 1 to 8 carbon atoms in the alkyl or cycloalkyl component, such as the methyl, ethyl, n-propyl, n-butyl, isopropyl, isobutyl, t-butyl esters and the isomeric pentyl, hexyl, octyl, dodecyl, hexadecyl or octadecyl esters of the acids mentioned above, acetoacetoxyethyl methacrylate, acrylonitrile, vinyl ether, methacrylonitrile, vinyl acetate, styrene, vinyl toluene and mixtures of these and other monomers.

Suitable monomers a3) include carboxy-functional unsaturated monomers such as acrylic acid, methacrylic acid, itaconic acid, crotonic acid, semi-esters of maleic and fumaric acid, and mixtures thereof.

Cyclic compounds b) are those having a molecular weight of 72 to 439 which, in the presence of alcoholic hydroxyl groups, are capable of reacting in the sense of a ring-opening polymerization reaction in the presence of alcoholic hydroxyl groups acting as initiator for such reaction. Examples of such compounds include lactones such as $\beta$-propiolactone, $\beta$-butyrolactone, $\gamma$-butyrolactone, $\gamma$-valerolactone, pivalolactone, $\epsilon$-caprolactone; substituted lactones such as methyl-, ethyl-, propyl- and dodecyl-$\epsilon$-caprolactone, dialkyl lactones, trialkyl lactones, cyclohexyl-$\epsilon$-caprolactone, phenyl-$\epsilon$-caprolactone, methoxy-$\epsilon$-caprolactone, ethoxy-$\epsilon$-caprolactone; cyclic carbonates such as ethylene carbonate, propylene carbonate and neopentyl glycol carbonate; epoxides such as 2-ethylhexyl glycidyl ether, phenyl glycidyl ether, glycidyl esters of versatic acid; and mixtures of such cyclic compounds. Lactones are preferably used; $\epsilon$-caprolactone is particularly preferred.

The low molecular weight polyhydric alcohols c) are those having a molecular weight of 62 to 1000, preferably 62 to 286. Examples include ethylene glycol, diethylene glycol, triethylene glycol, propane-1,2-diol, tripropylene glycol, propane-1,3-diol, butane-1,2-diol, butane-1,3-diol, butane-1,4-diol, butane-2,3-diol, pentane-1,5-diol, 2,2-dimethyl-propane-1,3-diol, hexane-1,6-diol, hexane-2,5-diol, 2-methyl-pentane-2,4-diol, octane diol, 2-ethylhexane-1,3-diol, hexadecane diol, octadecane diol, glycerol, hexane-1,2,6-triol and mixtures thereof. Diols which are liquid at room temperature and which have a boiling point above the polymerization temperature, such as butane-1,3-diol and 2-ethylhexane-1,3-diol, are preferred. Ether-modified polyhydric alcohols having the previously disclosed molecular weight are also suitable as component c). They may be obtained in known manner by the alkoxylation of the previously mentioned polyhydric alcohols with ethylene oxide and/or propylene oxide.

The process according to the invention is preferably carried out in the presence of free radical initiators d) which are suitable for the reaction temperatures used for the process according to the invention. Suitable initiators include dibenzoyl peroxide, di-tert.-butyl peroxide, dilauryl peroxide, tert.-butyl peroctoate, tert.-butyl peroxymaleate, tert.-butyl peroxybenzoate, dicumyl peroxide, didecanoyl peroxide, and azo compounds (such as 2,2'-azo-bis-(2,4-dimethylvaleronitrile), 2,2'-azo-bis-(isobutyronitrile), 2,2'-azo-bis-(2,3-dimethylbutyronitrile), and 1,1'-azo-bis-(1-cyclohexanenitrile)).

In accordance with the process according to the invention, a total of 5 to 500 parts by weight, preferably 10 to 200 parts by weight, of component b); a total of 2 to 300 parts by weight, preferably 4 to 100 parts by weight, of component c); and a total of 0.5 to 50 parts by weight, preferably 2 to 20 parts by weight, of the initiators d) are used, per 100 parts by weight of monomer mixture a).

In the process according to the invention, generally at least 20%, preferably 50 to 100%, by weight of the total quantity of component b) and/or at least 20%, preferably 50 to 100%, by weight of the total quantity of component c) is initially introduced into the reaction vessel and the remainders are added together with or at the same time as monomers a) in the course of the reaction.

In addition to the starting materials and initiators previously described, molecular weight regulators (such as n-dodecyl mercaptan or tert.-dodecyl mercaptan) may optionally be added during the reaction in quantities of up to 10% by weight, based on the total weight of the reaction mixture.

In many cases, it is also advisable to use catalysts for the ring-opening polymerization reaction of component b) in quantities of up to 0.8% by weight, based on the total quantity of the reaction mixture. Suitable catalysts include Lewis acids or organometallic compounds such as boron trifluoride etherate, tetrabutyl titanate, zinc chloride, zinc acetate, tin dioctoate, dibutyl tin oxide and mixtures thereof.

The process according to the invention is generally carried out at 80° to 220° C., preferably at 120° to 180° C. As previously mentioned, preferably at least 50% by weight of component b) and/or at least 50% by weight of component c) is initially introduced into the reaction vessel and heated to the reaction temperature. Thereafter monomer mixture a), initiator d) and any further quantities of components b) and c) are introduced. On completion of the addition, the reaction temperature is maintained while stirring until the reaction is complete. The components to be added to the reaction mixture may be introduced into the reaction vessel in the form of a mixture or at the same time as one another. The catalysts optionally used to accelerate the ring-opening polymerization reaction of component b) are generally added to the reaction medium in the reaction vessel before the beginning of the reaction.

The reaction may have to be reactivated by the subsequent addition of small quantities of initiator to achieve complete conversion of the monomers. If, in exceptional cases, an inadequate conversion is determined after termination of the reaction and even larger quantities of starting compounds a) and b) are present in the reaction mixture, they may either be removed by distillation or may be reacted by reactivation with the initiator or catalyst and heating to the reaction temperature.

The products obtained by the process according to the invention generally have a hydroxyl group content of 2 to 10% by weight, preferably 3 to 8% by weight, and a viscosity at 23° C. of 250 to 80,000, preferably 400 to 40,000 and more preferably 1,000 to 15,000 mPa.s.

The hydroxy-functional polymers according to the invention are suitable as solventless or low-solvent binders or binder components for coating compositions, sealing compositions, adhesives or printing inks. In order to further reduce viscosity and also to reduce reactivity, 10 to 100% by weight of the hydroxy groups may be converted into acetoacetic ester groups by polymer-analog reactions. The reaction with tert.-butyl acetoacetate, for example, is known and described, for example, in "Proceedings of the Sixteenth Waterborne and Higher-Solids Coatings Symposiun", 400 (1989). It takes place at a temperature of 120° to 160° C. and is complete in 60 minutes.

The hydroxy-functional products obtained by the process according to the invention or their acetoacetic-ester-modified transesterification products with alkyl acetoacetic esters, more particularly tert.-butyl acetoacetic ester, are preferably processed in combination with suitable hardeners. Suitable hardeners for the hydroxy-functional copolymers according to the invention include organic polyisocyanates, polyepoxides, amino crosslinking resins, polyanhydrides and olefinically unsaturated crosslinking agents, such as acryloylfunctional copolymers or esterification products of acrylic acid with polyhydric alcohols, which are capable of undergoing the Michael reaction.

When they are used as a binder component for coating compositions, sealing compounds, adhesives or printing inks, the products obtained by the process according to the invention may also be used in admixture with other hydroxy-functional binder components such as the polyhydroxy polyacrylate and polyhydroxypolyester resins known from coatings technology. However, when these mixtures are used, the products according to the invention are preferably used in quantities of at least 50% by weight, based on all of the hydroxy-functional components. In general, the binder compositions contain 20 to 99% by weight, preferably 40 to 80% by weight, of hydroxy-functional resins with the remainder being the previously described hardeners.

In a particularly preferred embodiment, the products according to the invention or their acetoacetic-ester-modified transesterification products are used as the polyhydroxyl component in one- or two-component polyurethane coating compositions. Known lacquer polyisocyanates containing free isocyanate groups (two-component coating compositions) or blocked isocyanate groups (one-component coating compositions) may be used as hardeners. The equivalent ratio of (blocked) isocyanate groups to hydroxyl groups is 0.5:1 to 2:1, preferably 0.8:1 to 1.5:1.

Suitable lacquer polyisocyanates which may be used in blocked form include biuret-, isocyanurate-, uretdione-, allophanate- or urethane-modified derivatives of monomeric diisocyanates, such as 2,4-diisocyanatotoluene, 2,6-diisocyanatotoluene, isophorone diisocyanate, 4,4'-diisocyanatodicyclohexyl methane and 1,6-diisocyanatohexane. The polyisocyanates generally contain 5 to 25% by weight isocyanate groups. NCO-functional prepolymers, which additionally contain ether, ester and/or amide groups, are also suitable.

Suitable blocking agents include oximes such as acetone oxime or butanone oxime; secondary amines such as diisopropyl amine, di-n-butyl amine or morpholine; ε-caprolactam; and malonic acid diethyl ester. Coating compositions containing the products according to the invention and blocked polyisocyanates as binder are suitable for use as low-viscosity stoving coating compositions which can be cured at temperatures of 80° to 180° C.

In the production of these coating compositions, the binders according to the invention may be mixed with known additives, e.g., flow control agents such as those based on cellulose esters or oligoalkyl acrylates; pigments and fillers, viscosity-controlling additives such as bentonites and silicic acid esters; matting agents such as silica, aluminum silicates and high molecular weight waxes; and catalysts for the crosslinking reaction such as tin(II) octoate or dimethyl benzyl amine.

The following examples are intended to illustrate the invention without limiting it in any way. All parts and percentages are by weight, unless otherwise indicated.

EXAMPLES

General procedure for Production Examples 1 to 12 summarized in the following Table:

The components of part I were placed in a reaction vessel and heated with stirring to the polymerization temperature. Part II was continuously introduced over a period of 3 hours and, at the same time, part III was continuously introduced over a period of 3.5 hours. After another 3 hours at the same temperature, the product was cooled to room temperature. The composition of parts I to III (which are set forth in grams), the polymerization temperature and also the OH content and viscosity of the products are set forth in the following Table.

| Example | 1 | 2 | 3 | 4 | 5 | 6 | 7 | 8 | 9 | 10 | 11 | 12 |
| --- | --- | --- | --- | --- | --- | --- | --- | --- | --- | --- | --- | --- |
| Part I | | | | | | | | | | | | |
| ε-Caprolactone | 403 | 403 | 403 | 403 | 403 | 403 | 403 | 403 | 403 | 403 | 403 | 403 |
| Butane-1,3-diol | 100 | 100 | | | 100 | 100 | 100 | 100 | 100 | 77 | 100 | 100 |
| Butane-1,4-diol | | | 100 | | | | | | | | | |
| 2-Ethyl hexane-1,3-diol | | | | 100 | | | | | | | | |
| Tin dioctoate | | 0.5 | 0.5 | 0.5 | | | | | | | | |
| Part II | | | | | | | | | | | | |
| Hydroxypropyl methacrylate | 205 | 205 | 205 | 205 | 205 | 205 | 205 | 205 | 205 | 205 | 155 | 205 |
| Styrene | | | | | | | | | | 100 | | |
| n-Butyl methacrylate | | | | | | 100 | | | 150 | 100 | 150 | 200 |
| 2-Ethyl hexyl acrylate | 222 | 222 | 222 | 222 | 212 | 122 | 122 | 122 | 72 | 122 | 122 | 172 |
| Isobornyl methacrylate | | | | | | | 100 | | | | | |
| Acrylic acid | | | | | 10 | | | | | | | |
| Dodecyl mercaptan | | 10 | 10 | 10 | 10 | | | | | | | |
| Part III | | | | | | | | | | | | |
| Di-tert.- | 60 | 60 | 60 | 60 | 60 | 60 | 60 | 60 | 60 | 60 | 60 | 60 |

| Example | 1 | 2 | 3 | 4 | 5 | 6 | 7 | 8 | 9 | 10 | 11 | 12 |
|---|---|---|---|---|---|---|---|---|---|---|---|---|
| butyl peroxide | | | | | | | | | | | | |
| Polymerization temperature | 160 | 160 | 160 | 160 | 160 | 160 | 170 | 150 | 160 | 160 | 160 | 160 |
| OH content | 5.6 | 5.5 | 5.2 | 4.2 | 5.5 | 5.8 | 5.8 | 5.9 | 5.8 | 5.2 | 5.3 | 5.8 |
| Viscosity at 23° C. (mPa · s) | 3500 | 1500 | 1900 | 6000 | 2100 | 3000 | 3000 | 13000 | 3100 | 3500 | 1800 | 10000 |

[1] Adduct of propylene oxide with acrylic acid in a molar ratio of 1:1

Example 13 (Use)

64 g of an isocyanurate-modified lacquer polyisocyanate prepared from 1,6-diisocyanatohexane and having an NCO content of 21.5% (Desmodur N 3300, a product of Bayer AG, Leverkusen) were added to 100 g of the polyhydroxyl compound of Example 1 (NCO:OH equivalent ratio—1:1). The resulting mixture was knife-coated onto a test plate in a layer thickness of 100 μm over a period of 90 minutes. After 24 hours, the mixture had cured to form a solvent resistant and light stable coating.

Example 14 (Use)

44 g of a polyisocyanate mixture of the diphenyl methane series having an NCO content of 31.5% (Desmodur VL, a product of Bayer AG, Leverkusen) were added to 100 g of the polyhydroxyl compound of Example 1 (NCO:OH equivalent ratio—1:1). The mixture was subsequently knife-coated onto a test plate in a layer thickness of 100 μm. A solvent resistant coating was obtained after 6 hours at room temperature.

Example 15 (Use)

12 g tert.-butyl acetoacetate were added to 100 g of the polyhydroxyl compound of Example 1 and heated to 160° C. The tert.-butanol formed was distilled off. After 1 hour, the product had a viscosity of 2,000 mPa.s (23° C.). 44 g of the polyisocyanate of Example 14 and the total quantity of modified polyhydroxyl compound (NCO:OH equivalent ratio—1:1) are mixed. The resulting mixture was knife-coated onto a test plate in a layer thickness of 100 μm. A solvent-resistant lacquer film was obtained after 12 hours at room temperature.

Example 16 (Use)

30 g of a commercially available, highly methylated melamine resin (Cymel 303, a product of Cyanamid GmbH) were added to 100 g of the polyhydroxyl compound of Example 9. The product was knife-coated onto a test plate in a layer thickness of 150 μm and, finally, was cured for 30 minutes at 160° C. to form a solvent-resistant coating.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a polyhydroxyl compound having a hydroxyl group content of 2 to 10% by weight and a viscosity at 23° C. of 250 to 80,000 mPa.s which comprises free radically polymerizing at a reaction temperature of 80° to 220° C.
   a) 100 parts by weight of a mixture of olefinically unsaturated monomers containing at least 1% by weight of monomers containing alcoholic hydroxyl groups in the presence of
   b) 5 to 500 total parts by weight, which may be present at the beginning of the reaction and/or added during the reaction, of one or more cyclic compounds which, in the presence of initiator compounds containing alcoholic hydroxyl groups, are capable of a ring-opening polymerization reaction and
   c) 2 to 300 parts by weight, which may be present at the beginning of the reaction and/or added during the reaction, of one or more polyhydric alcohols having a molecular weight of 62 to 1000.

2. The process of claim 1 which comprises carrying the free radical polymerization reaction in the presence of 0.5 to 50 parts by weight of a polymerization initiator.

3. The process of claim 1 wherein monomer mixture
   a) comprises
   a1) 5 to 50% by weight monomers containing alcoholic hydroxyl groups,
   a2) 45 to 95% by weight monomers which are free from hydroxyl and carboxyl groups and
   a3) 0 to 5% by weight carboxy-functional monomers.

4. The process of claim 1 wherein component b) comprises ϵcaprolactone.

5. The process of claim 3 wherein component b) comprises ϵ-caprolactone.

6. The process of claim 1 which comprises carrying out the reaction in the presence of Lewis acids or metal salts as catalysts which accelerate the ring-opening polymerization.

7. The process of claim 2 which comprises initially introducing at least 20% by weight of the total quantity of component b) and/or at least 20% by weight of the total quantity of components c) into a suitable reaction vessel, then continuously adding monomer mixture a), any polymerization initiator and any remaining quantities of starting components b) and/or c) and maintaining the reaction temperature until a monomer conversion of at least 96% by weight is achieved.

* * * * *